March 14, 1950 L. D. NORTON 2,500,561

PHONOGRAPH PICKUP HAVING ELASTIC DRIVE MEMBER

Filed Sept. 30, 1948

INVENTOR
*Leland D. Norton*
BY
*Blair, Curtis & Hayward*
ATTORNEYS

Patented Mar. 14, 1950

2,500,561

UNITED STATES PATENT OFFICE 2,500,561

PHONOGRAPH PICKUP HAVING ELASTIC DRIVE MEMBER

Leland D. Norton, Fairfield, Conn., assignor to Dictaphone Corporation, Bridgeport, Conn., a corporation of New York Application September 30, 1948, Serial No. 52,005

2 Claims. (Cl. 179—100.41)

This invention relates to electro-mechanical translating for use in recording and reproducing sound, and is more particularly concerned with piezo-electric pickups or reproducers designed and employed for the purpose of translating into electrical sound waves the mechanical record of such waves which has been cut upon a wax cylinder, or impressed on other record receiving surfaces.

An object is to provide simple and efficient means especially adapted and effective for damping or otherwise absorbing vibrations to offset the effects of resonance more or less inherent in the aforesaid type of reproducer and thus to a great extent to eliminate or mitigate the effect of resonance points over a broad range of audible frequencies.

Another object is to provide simple and durable means which helps to improve tracking of the record sound groove by the pickup device and smooth out the response characteristic within the whole frequency response range. Other objects will be in part obvious and in part pointed out hereinafter.

The invention accordingly consists in the features of construction, combinations of elements, and arrangements of parts, as will be exemplified in the structure to be hereinafter described and the scope of the application of which will be indicated in the following claims.

In the accompanying drawings in which is shown one of the various possible embodiments of the invention:

Figure 1:
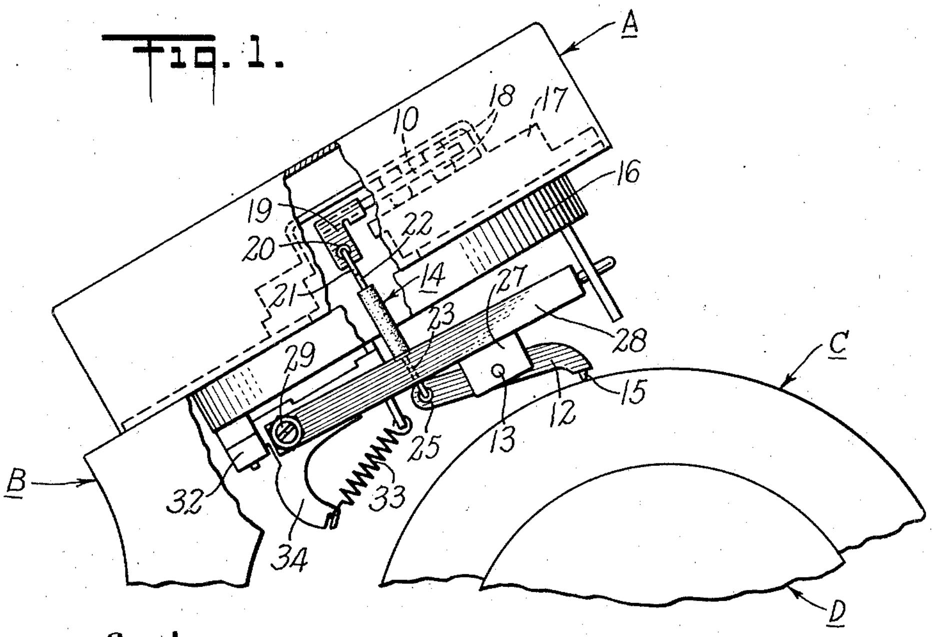
Fig. 1 is a side view of a portion of a well-known type of sound reproducing machine carriage, showing the pickup device in operative disposition relative to a cylindrical sound record.

Similar reference characters refer to similar parts throughout the various views of the drawings. As shown in the drawings the pickup device or reproducer, generally indicated by A, is suitably mounted upon a carriage B in operative relation to a record cylinder C which may be rotated in the usual manner by mandrel D.

While the present invention is particularly described in relation to a piezo-electric crystal translating unit, it might be employed as a connection between a stylus support and some other form of vibratory device, such as the armature of an electro-magnet, or the standard type of acoustic diaphragm, shown in U. S. Patent No. 1,726,574, to which reference is here made for a more complete description of the sound reproducer unit in relation to some of its more specific features of construction.

Referring to Figure 1, the unit A will be seen to comprise a piezo-electric crystal 10, a stylus lever 12, and a link, generally indicated at 14, which serves in a suitable manner to transmit vibrations picked up from the record by a stylus 15 to the crystal 10. A plate 16 and suitable crystal supporting structure 17, removably secured to the carriage B, serves as a mounting for the crystal 10, which is itself supported, in a usual manner, at three of its corners, leaving a fourth corner free to be connected to the stylus lever 12 by the link 14. As shown, the crystal supports include resilient pads 18. The free corner of the crystal is provided with a suitable corner clamp and stirrup 19, perforated as at 20 to receive a hook 21 of an upper metal member 22 of the link 14. A lower metal link member 23 is formed as a hook 24 to engage with an opening 25 disposed at one end of the stylus lever 12.

The lever 12 carries at its opposite end the reproducing stylus 15 and is pivotally mounted, by means of a horizontal pin 13 between flanges 27 which depend from a reproducer weight lever 28, pivotally supported by a pivot screw 29 from a bracket 32 extending downwardly from the plate 16.

When not raised by manually controlled means (not shown), the reproducer weight 28 tends to occupy a lowered position with reference to the record C, as shown in Figure 1, due both to its own weight and the action of a spring 33 located between the said weight and an arm 34 on the bracket 32.

Figure 2:
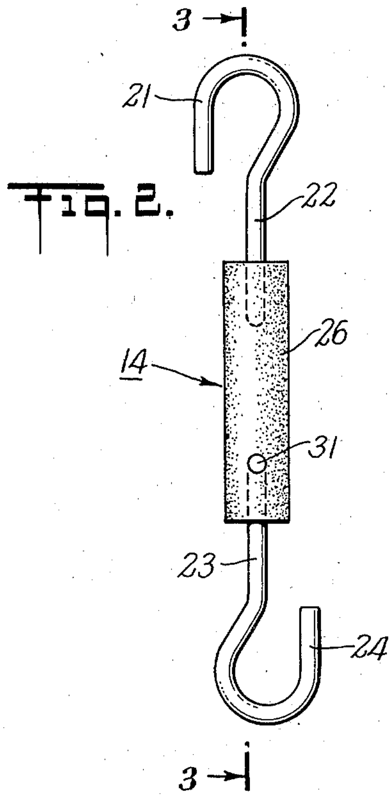
Figure 2 is a side elevation of a link embodying the present invention.
Figure 3:
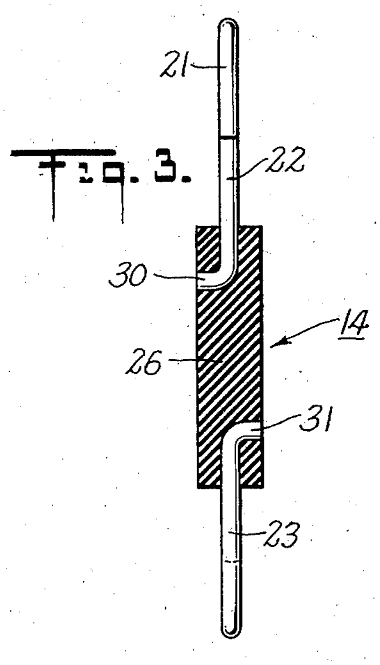
Figure 3 is in part a side elevation and in part a vertical section, taken on line 3—3 of Figure 2.

Referring specifically to Figure 2 and 3, it will be seen that the link 14 consists of a small block or strip 26 of rubber or rubberlike substance, into the opposite ends of which the hooked wires 22 and 23 have been molded. Bent portions 30 and 31 of the wires 22 and 23 help to bond securely the rubber link portion thereto, thus providing a permanent connection between wire and rubber. Other methods for interposing a rubber-like link between point holder and stylus might be employed without departing from the scope of the invention. For example, the rubber-like portion of the link might be secured to its connection members by means of an adhesive.

As an example of a link of the nature described which has given satisfactory results in a standard reproducer unit, the link used has an overall length of about 63 hundredths of an inch. The rubber-like portion of this link has a circular cross section of about 0.060 to 0.065 inch in diameter, and its length is about one quarter of an inch, with the portion between the hooked ends 30 to 31 of wires 22 and 23 being approximately one eighth of an inch. A satisfactory link block may be composed of a Buna N synthetic rubber having a durometer value of 65–75, such as for example, the product identified by the trade name Hycar and manufactured by Goodrich Rubber Company. However any other rubber, synthetic rubber or materials of similar characteristics may be used provided the dimensions thereof are selected to suit. In the particular example mentioned, the rubber-like link 14 has a compliance of $0.35 \times 10^{-6}$ centimeters per dyne, and that of the reproducer-weight spring 33 is $1.6 \times 10^{-6}$ centimeters per dyne. The mass of the recorder weight lever 28 is selected to resonate with the compliance of link 14 at 200 cycles per second or less, and the natural resonance frequency of the crystal 18 when clamped in position with the stirrup 19 connected through the link 14 to the stylus lever 12 is about 3000 cycles per second, with the mass of lever 12 being sufficiently small so as not to form with link 14 a low-pass filter which cuts off at a frequency less than that of crystal resonance. Such a reproducer unit provides a frequency response curve with a smooth peak at about 200 cycles with a sharp cut off below that frequency and with a smooth curve above that frequency to a second and smaller peak at about 3000 cycles with a sharp high frequency cutoff thereafter. This forms a most desirable response characteristic curve, especially for business sound recording and reproducing operations.

One of the effects of the rubber-like link through which the force is transmitted to the crystal is to cause a slight peak at the lower end of the frequency response range due by inter-action with the mass of the reproducer weight. In addition, the damping of the material used in this link prevents this peak from becoming too sharp and too high. Furthermore, the damping due to this link material helps to improve tracking of the record groove by maintaining continuous contact between stylus and groove, thus smoothing out the characteristic of the unit over the entire audible frequency range. This low frequency response can be adjusted by proper selection of the mass of the reproducer weight and the compliance of the rubber-like link. The high frequency response is influenced by the rubber link only to a very small degree. It is affected primarily by the weight of the reproducer stylus lever, the stiffness and location of the crystal mounting pads, and the natural resonance frequency of the crystal.

In operation it will be understood that the signal is transmitted from the cylinder to the stylus lever 12 causing a combined rotary and translational motion of the stylus lever, with the center of rotation of the stylus lever varying its position with frequency variations, especially in the range between 100–500 cycles per second. At or below 100 cycles, the whole system, as defined above, rotates about the weight-lever pivot 29. As the frequency of motion picked up by the stylus increases above 500 cycles, the reproducer weight becomes, in effect, practically a fixed and solid mass with all the sound translational motion taking place about the pivot 13 of the stylus lever 12.

It will be understood that the standard all-wire link usually employed for the purposes described herein forms a comparatively stiff element with a very small compliance. At the higher frequencies the bends at the ends of such a wire link may open up slightly, causing a lateral vibration of the link which may result in the radiation of undesirable sounds or "back-talk." In the past, attempts have been made to prevent this by sealing the wire link into a mass of sealing wax, shellac, or the like. In such a case, the effect of the sealing wax is to tend to render the link completely rigid and thus prevent any independent motion of the connecting link. The results attained in this way have been found more or less unsatisfactory for the purpose stated. In contrast, the present invention discloses the intentional provision of means permitting the introduction of independent motion in such a connecting link, and of such compliance as to interact with the stylus lever and reproducer weight to effect a smooth response characteristic in the lower frequency range.

From the foregoing it will be seen that a reproducing unit in accordance with the present invention is well adapted to attain the ends and objects hereinbefore set forth and to be economically manufactured for such use. As many possible embodiments may be made of the above invention and as many changes might be made in the embodiment above set forth, it is to be understood that all matter herein before set forth or shown in the accompanying drawings is to be interpreted as illustrative and not in a limiting sense.

I claim:

1. A phonographic sound reproducer unit comprising, in combination, a support for a piezo-electric crystal member, a weight lever pivotally mounted on said support for relative up and down movement, a stylus-holding lever pivotally mounted on said weight lever for relative up and down movement, and a link connecting the said crystal and said stylus lever comprising a pair of spaced relatively rigid members for engaging said crystal and lever respectively and a compliant tension member of rubber, or the like, bonded between the oppositely disposed ends of said compliant member.

2. In a phonographic sound reproducer unit comprising a vibratably mounted piezo-electric crystal, a weight lever pivotally mounted beneath said crystal for movement toward and away from said crystal, a spring tending to oppose the action of gravity upon said weight lever, a stylus lever mounted upon and beneath said weight lever and having a stylus supported at one end for engagement with a sound record, the combination with said crystal and said stylus lever of a connecting link comprising a pair of spaced wire hooks for engaging said crystal and stylus lever respectively and a rubber tension member bonded between the oppositely disposed ends of said wire hooks.

LELAND D. NORTON.

REFERENCES CITED

The following references are of record in the file of this patent:

UNITED STATES PATENTS

| Number | Name | Date |
|---|---|---|
| 1,243,680 | Baake | Oct. 23, 1917 |
| 1,907,529 | Faure-Roux | May 9, 1933 |
| 1,980,888 | Thomas | Nov. 13, 1934 |
| 2,085,320 | Kolstrand | June 29, 1937 |
| 2,227,072 | Di Toro | Dec. 31, 1940 |
| 2,328,952 | Burt | Sept. 7, 1943 |